United States Patent
Mayerchak et al.

(10) Patent No.: US 12,536,528 B2
(45) Date of Patent: Jan. 27, 2026

(54) CROSS-BLOCKCHAIN TRANSACTION REBROADCASTING

(71) Applicant: Circle Internet Group, Inc, Boston, MA (US)

(72) Inventors: Walker Mayerchak, Somerville, MA (US); Chase McDermott, Houston, TX (US); Michael Grant, Walpole, MA (US)

(73) Assignee: Circle Internet Group, Inc., Boston, MA (US)

( * ) Notice: Subject to any disclaimer, the term of this patent is extended or adjusted under 35 U.S.C. 154(b) by 127 days.

(21) Appl. No.: 18/127,588

(22) Filed: Mar. 28, 2023

(65) Prior Publication Data

US 2024/0202708 A1   Jun. 20, 2024

Related U.S. Application Data

(60) Provisional application No. 63/432,959, filed on Dec. 15, 2022.

(51) Int. Cl.
*G06Q 20/36* (2012.01)
*G06Q 20/38* (2012.01)

(52) U.S. Cl.
CPC ..... *G06Q 20/3678* (2013.01); *G06Q 20/3825* (2013.01); *G06Q 2220/00* (2013.01)

(58) Field of Classification Search
CPC ........... G06Q 20/3678; G06Q 20/3825; G06Q 2220/00

See application file for complete search history.

(56) References Cited

U.S. PATENT DOCUMENTS

| | | | |
|---|---|---|---|
| 10,600,009 B1* | 3/2020 | Augustine | H04L 9/0637 |
| 2007/0038561 A1* | 2/2007 | Vancini | G06Q 20/108 |
| | | | 705/39 |
| 2019/0172026 A1* | 6/2019 | Vessenes | G06Q 20/065 |
| 2021/0019737 A1* | 1/2021 | Vladi | G06Q 20/02 |
| 2023/0020520 A1* | 1/2023 | Kaplan | G06Q 20/02 |
| 2024/0007329 A1* | 1/2024 | Doney | G06F 16/2379 |

OTHER PUBLICATIONS

Wang, Kaili: "Reversible Transactions on Ethereum: ERC-20R and ERC-721R", https://mirror.xyz/kaili.eth/gB-rx89sNAT3CVuxWo6xVFS5ptNclIW7cVWVCfcFa6k (Sep. 24, 2022), 6 pages.

* cited by examiner

*Primary Examiner* — Patrick McAtee
*Assistant Examiner* — Zesheng Xiao
(74) *Attorney, Agent, or Firm* — Dinsmore & Shohl LLP

(57) ABSTRACT

Certain aspects of the disclosure provide a method for performing a blockchain-based transaction, comprising: broadcasting a burn operation on a first blockchain in a first message including a first recipient address and an amount of cryptocurrency to be burned; receiving an attestation of the first message from an attestation service; rebroadcasting the burn operation on the first blockchain in a second message including the attestation of the first message and a second recipient address; receiving an attestation of the second message from the attestation service; and causing the amount of cryptocurrency to be minted on a second blockchain.

9 Claims, 3 Drawing Sheets

CROSS-BLOCKCHAIN TRANSACTION REBROADCASTING

CROSS REFERENCE TO RELATED APPLICATIONS

The present disclosure claims benefit of U.S. Provisional Patent Application Ser. No. 63/432,959, filed Dec. 15, 2022, the entirety of which is incorporated by reference herein.

INTRODUCTION

Aspects of the present disclosure relate to rebroadcasting of cryptocurrency transactions, and in particular to cross-blockchain rebroadcasting.

A blockchain is generally a distributed database or ledger that is shared among nodes of a computer network, and thus is sometimes referred to as a blockchain network. Generally, "chain" or "blockchain" may refer to a blockchain network. Blockchains are generally configured to store information electronically in a digital format, such as the record of ownership of an asset, like a cryptocurrency asset.

Recently, a plethora of blockchain networks have emerged to facilitate many types of useful transactions, such as supply chain management, peer-to-peer transactions, and the like. One notorious use of blockchains is for cryptocurrency systems.

A core tenet of blockchain transactions, such as cryptocurrency transactions, is irreversibility, which is beneficial in most cases. However, the fact that cryptocurrency transactions are irreversible can be a problem if a user makes a mistake when performing a cryptocurrency transaction (e.g., sending cryptocurrency to a recipient), because there is no way to recover the assets. Simple mistakes often lead to user funds being permanently lost. This issue is only compounded when cross-blockchain transactions are attempted due to the more complex nature of such transactions.

Accordingly, there is a need for methods of rebroadcasting blockchain transactions to correct errors in an original transaction.

SUMMARY

Certain aspects provide a method for performing a blockchain-based transaction, comprising: broadcasting a burn operation on a first blockchain in a first message including a first recipient address and an amount of cryptocurrency to be burned; receiving an attestation of the first message from an attestation service; rebroadcasting the burn operation on the first blockchain in a second message including the attestation of the first message and a second recipient address; receiving an attestation of the second message from the attestation service; and causing the amount of cryptocurrency to be minted on a second blockchain.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatuses, methods, processing systems, and computer-readable mediums for rebroadcasting of blockchain transactions, such as cryptocurrency transactions, and in particular to cross-blockchain rebroadcasting.

As above, the irreversibility of blockchain transactions, such as cryptocurrency transactions, can be a significant technical problem if a user makes a mistake when performing the transaction. For example, making a typographical error in a recipient's address could lead to immutable loss of an asset being transferred to that address.

Various naive solutions to this technical problem have been attempted. For example, the sender of an erroneous transaction can request the unintended recipient to return the asset (e.g., cryptocurrency) back to the sender. Unfortunately, there is no guarantee that the recipient exists, and if they do exist, it is not certain that they will send the asset back to the sender.

As another example, the sender can request the asset issuer to burn the funds and re-mint them in favor of the intended recipient. Unfortunately, there is no guarantee that the asset issuer exists, and if they do exist, it is not certain that they will burn the funds and re-mint as requested. Even if the asset issuer exists, they may charge a fee for the burning and reminting, which may lead to loss even if the transaction is ultimately completed.

As a further example, in a blockchain network with "mempools" (a cryptocurrency node's mechanism for storing information on unconfirmed transactions) and extended block time, a user that quickly (e.g., within seconds) identifies the mistake may have the opportunity to replace the erroneous transaction with a correct transaction by increasing the fee and broadcasting a new transaction. Note that the effectiveness of this approach is indirectly correlated to the speed at which the relevant blockchain can confirm transactions in a block. Even with this possibility, the practical timeline is such that an erroneous transaction is rarely if ever corrected by the new broadcast.

Aspects described herein overcome these technical problems in conventional blockchain systems by enabling a user to rebroadcast a transaction with corrected details (e.g., a corrected recipient address) along with an attestation of the original transaction to, for example, attest to the fact that currency has already been burned so that a correct minting operation may be performed on behalf of the correct recipient.

Accordingly, the rebroadcast methods described herein are a technical solution to technical problems associated with conventional blockchain networks' inability to reverse erroneous blockchain transactions.

Example System for Cross-Blockchain Rebroadcasting

Figure 1:
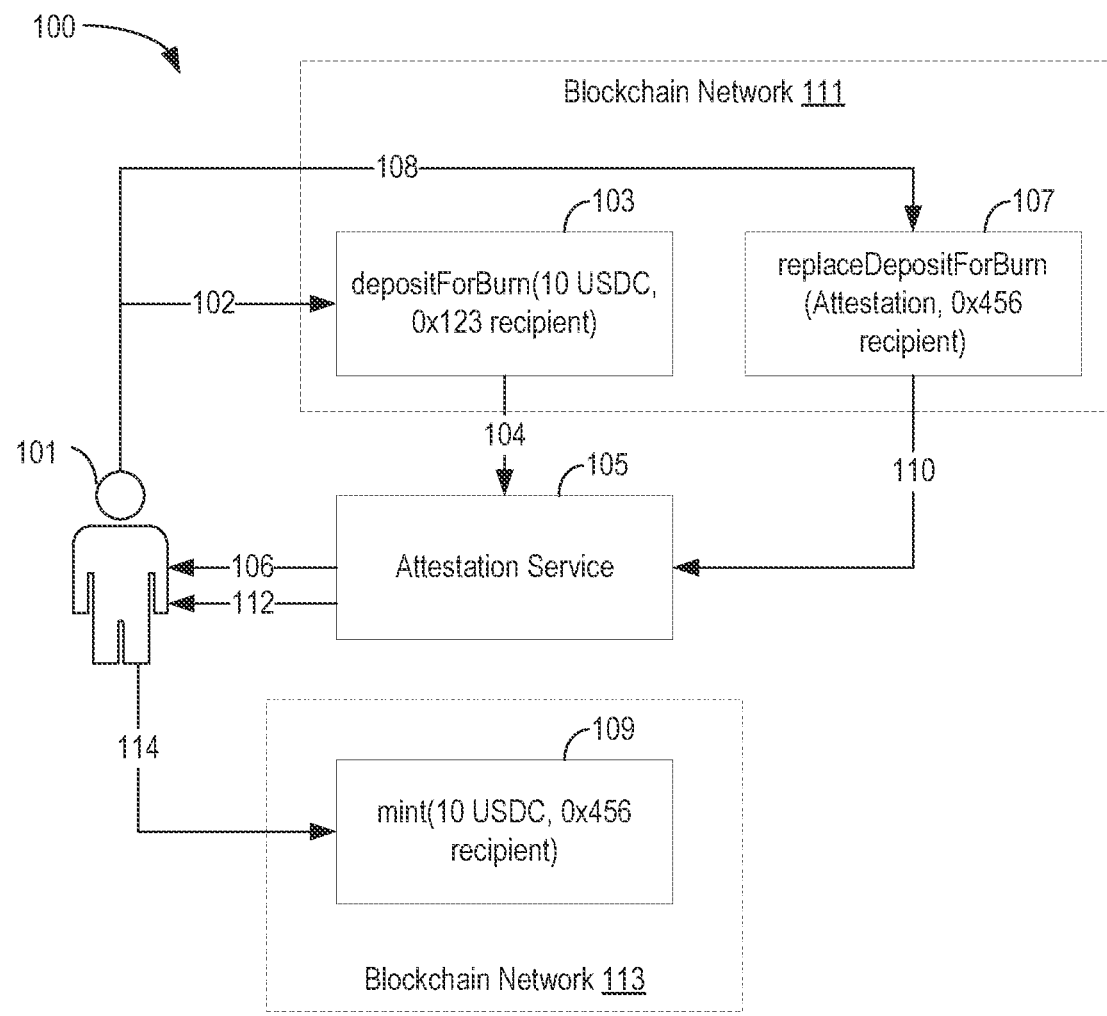
FIG. 1 depicts an example of rebroadcasting a blockchain transaction across blockchains.

FIG. 1 depicts an example 100 of rebroadcasting a blockchain transaction across blockchains. In this example, the cross-blockchain transaction is a cryptocurrency transaction; however, in other examples, different sorts of blockchain transactions may be completed according to the same principles.

Initially, user 101 intends to perform a cryptocurrency transaction in which currency is transferred from blockchain network 111 to a recipient in blockchain network 113, which is a type of cross-blockchain transaction. To do so, user 101 initially broadcasts the transaction at 102 using function 103 (referred to as "depositForBurn" in this example) within blockchain network 111, which causes a burn operation for the configured amount of cryptocurrency. In this example, function 103 processes multiple information elements associated with the transaction, including an amount of cryptocurrency to transfer (10 USDC in this example) and a recipient address (0x123 in this example) associated with a recipient of the transferred cryptocurrency.

In this example, at 104, user 101 requests attestation service 105 to attest to the burn operation according to the broadcasted transaction. For example, user 101 may provide a hash associated with the broadcasted burn operation to attestation service 105. Attestation service 105 is able to read on-chain activity within blockchain network 111 and confirms the burn operation. Attestation then sends an attestation (e.g., a signature) associated with the transaction to user 101 at 106.

At some point before the initial transaction is completed, user 101 determines that the initial transaction included an error, namely, an incorrect recipient address. In a conventional blockchain network system, user 101 may not have any recourse to cancel or redirect the transfer. However, aspects described herein overcome this technical deficiency in existing blockchain network systems.

After determining the error, user 101 rebroadcasts the transaction at 108 using a new function 107 (referred to as "replaceDepositForBurn" in this example). In this example, function 107 processes multiple information elements associated with the rebroadcasted transaction, including the attestation of the original burn of the amount of cryptocurrency (10 USDC) in the initial broadcast and a new recipient address (0x456) associated with the correct recipient.

Like the initial broadcast, at 110, user 101 requests attestation service 105 to attest to the rebroadcasted transaction. As above, user 101 may provide attestation service 105 with a hash associated with the rebroadcasted transaction. Attestation service 105 confirms the rebroadcasted transaction within blockchain network 111 and then sends another attestation (e.g., a signature) associated with the rebroadcasted transaction to user 101 at 112.

User 101 then initiates a mint operation using function 109 within blockchain network 113 at 114, which is configured to mint the new currency for the correct recipient at address (0x456). Once the new cryptocurrency is minted and received by the correct recipient, the cross-blockchain transaction is complete.

Example Method for Cross-Blockchain Rebroadcasting

Figure 2:
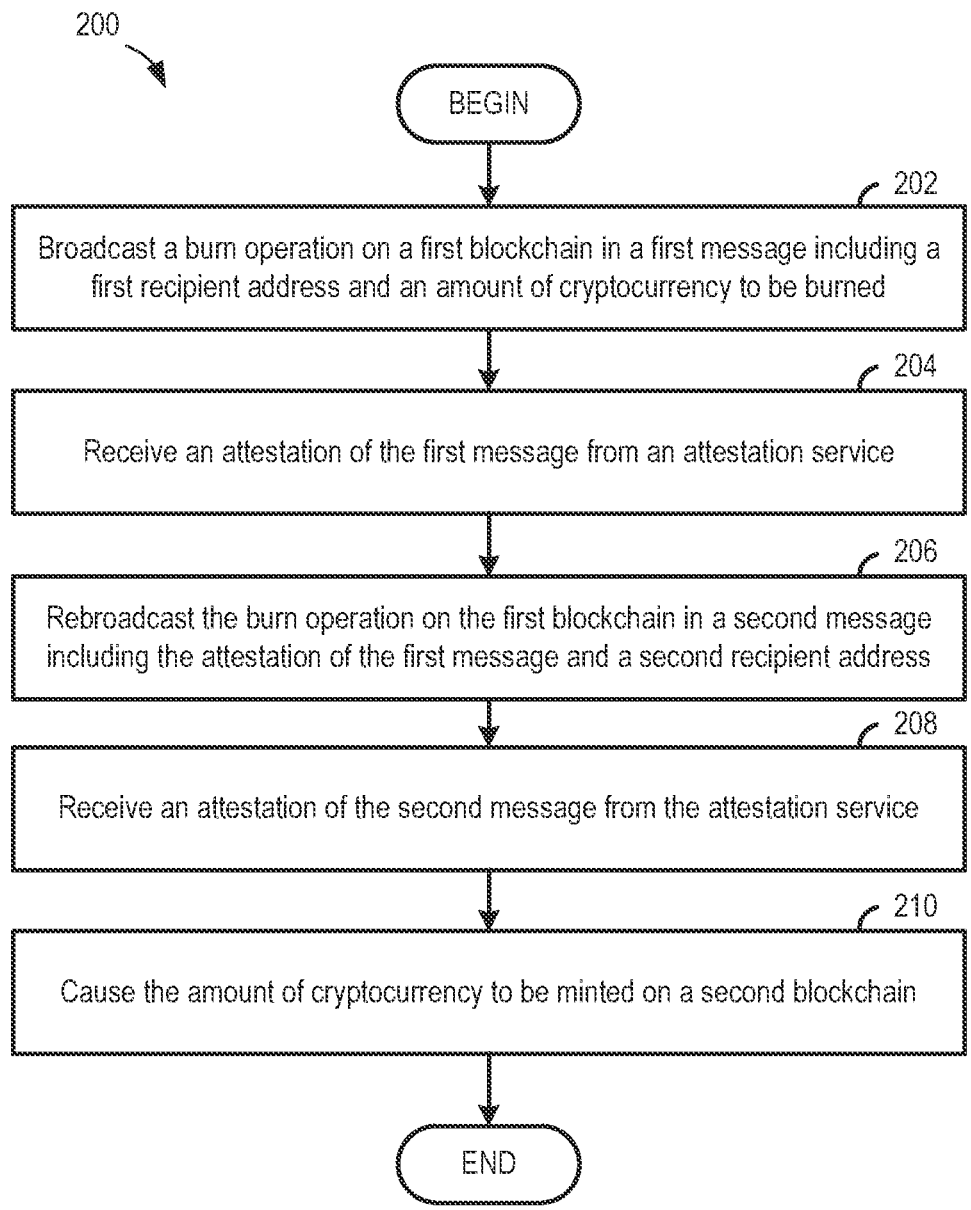
FIG. 2 depicts an example method of rebroadcasting a blockchain transaction across blockchains.

FIG. 2 depicts an example method 200 for rebroadcasting a transaction across blockchains, such as blockchain networks 111 and 113 of FIG. 1.

Method 200 begins at step 202 with broadcasting a burn operation on a first blockchain in a first message including a first recipient address and an amount of cryptocurrency to be burned, such as depicted at 103 in FIG. 1.

In some aspects, the second recipient address is located in a second blockchain.

In some aspects, the first message is associated with a smart contract.

Method 200 then proceeds to step 204 with receiving an attestation of the first message from an attestation service.

In some aspects, the attestation of the first message comprises a signature created based on a private key of the attestation service.

In some aspects, the attestation service is external to the first blockchain, such as depicted in FIG. 1.

Method 200 then proceeds to step 206 with rebroadcasting the burn operation on the first blockchain in a second message including the attestation of the first message and a second recipient address, such as depicted at 107 in FIG. 1.

Method 200 then proceeds to step 208 with receiving an attestation of the second message from the attestation service.

Method 200 then proceeds to step 210 with causing the amount of cryptocurrency to be minted on a second blockchain.

In some aspects, causing the amount of cryptocurrency to be minted on the second blockchain, comprises broadcasting a mint operation on the second blockchain in a third message, such as depicted at 109 in FIG. 1. In some aspects, the third message comprises the attestation of the second message.

In some aspects, method 200 further includes requesting, from the attestation service, the attestation of the first message; and requesting, from the attestation service, the attestation of the second message, such as depicted at 104 and 110 with respect to attestation service 105 in FIG. 1.

In some aspects, the cryptocurrency is a stable coin.

Note that FIG. 2 is just one examples of a method, and other methods including fewer, additional, or alternative steps are possible consistent with this disclosure.

Example Processing System for Cross-Blockchain Rebroadcasting

Figure 3:
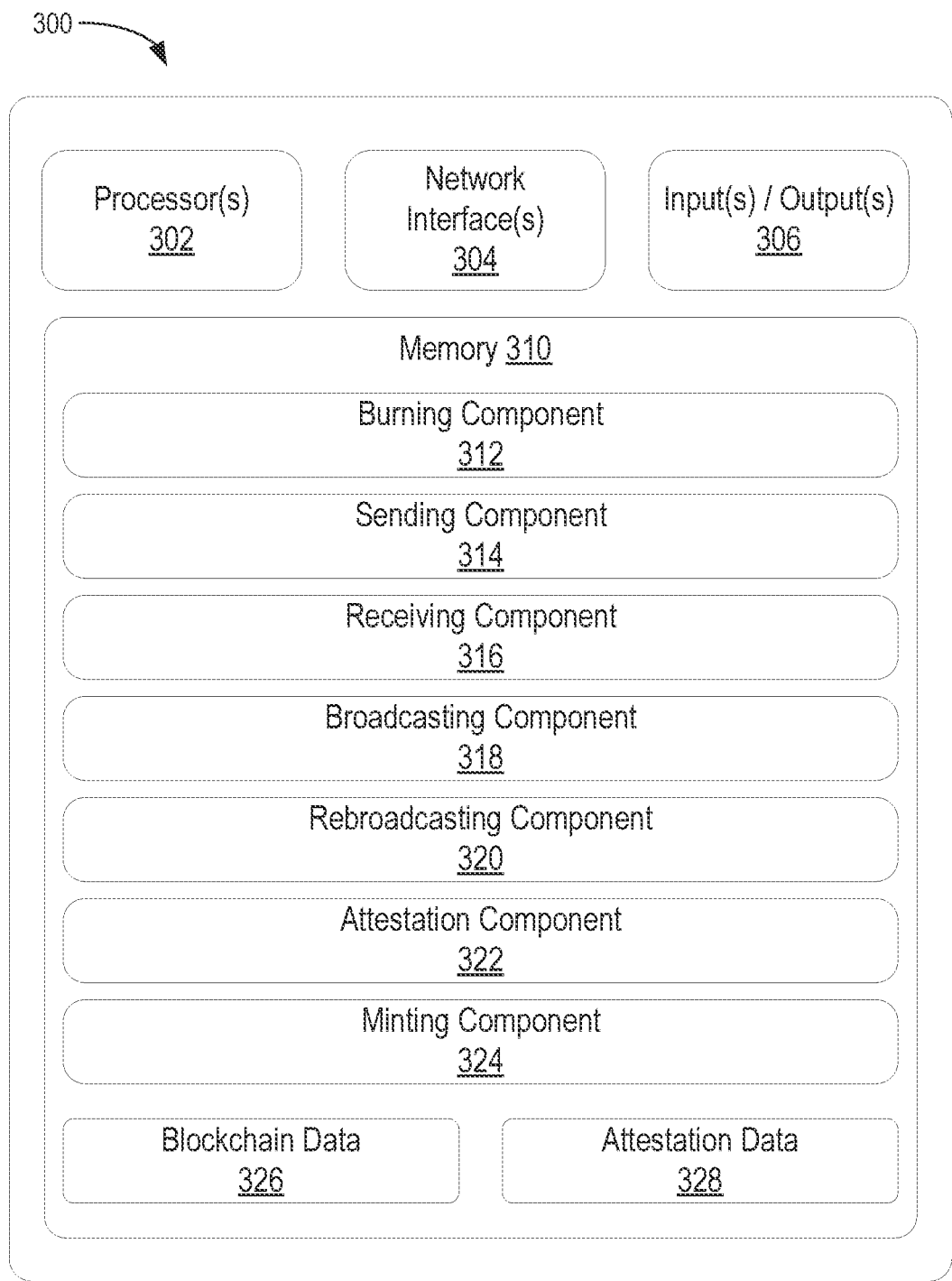
FIG. 3 depicts an example processing system configured to perform the various methods described herein.

FIG. 3 depicts an example processing system configured for performing various aspects of the methods described herein, including method 200 discussed above with respect to FIG. 2.

Processing system 300 includes one or more processors 302. Generally, processor(s) 302 may be configured to execute computer-executable instructions (e.g., software code) to perform various functions, as described herein.

Processing system 300 further includes a network interface(s) 304, which generally provides data access to any sort of data network, including personal area networks (PANs), local area networks (LANs), wide area networks (WANs), the Internet, and the like. In some cases, network interface(s)

304 provide access to blockchain networks, including source and destination blockchain networks, such as described above.

Processing system 300 further includes input(s) and output(s) 306, which generally provide means for providing data to and from processing system 300, such as via connection to computing device peripherals, including user interface peripherals.

Processing system further includes a memory 310 configured to store various types of components and data.

In this example, memory 310 includes a burning component 312, a sending component 314, a receiving component 316, a broadcasting component 318, a rebroadcasting component 320, an attestation component 322, a minting component 324, blockchain data 326, and attestation data 328.

Processing system 300 may be implemented in various ways. For example, processing system 300 may be implemented within on-site, remote, or cloud-based processing equipment.

Note that while depicted as a single processing system in FIG. 3, aspects of processing system 300 may be distributed among a plurality of processing systems.

Processing system 300 is just one example, and other configurations are possible. For example, in alternative embodiments, aspects described with respect to processing system 300 may be omitted, added, or substituted for alternative aspects.

Example Clauses

Implementation examples are described in the following numbered clauses:

Clause 1: A method for performing a blockchain-based transaction, comprising: broadcasting a burn operation on a first blockchain in a first message including a first recipient address and an amount of cryptocurrency to be burned; receiving an attestation of the first message from an attestation service; rebroadcasting the burn operation on the first blockchain in a second message including the attestation of the first message and a second recipient address; receiving an attestation of the second message from the attestation service; and causing the amount of cryptocurrency to be minted on a second blockchain.

Clause 2: The method of Clause 1, wherein the second recipient address is located in the second blockchain.

Clause 3: The method of any one of Clauses 1-2, wherein the first message is associated with a smart contract.

Clause 4: The method of any one of Clauses 1-3, further comprising: requesting, from the attestation service, the attestation of the first message; and requesting, from the attestation service, the attestation of the second message.

Clause 5: The method of any one of Clauses 1-4, wherein the cryptocurrency is a stable coin.

Clause 6: The method of any one of Clauses 1-4, wherein the attestation of the first message comprises a signature created based on a private key of the attestation service.

Clause 7: The method of any one of Clauses 1-5, wherein the attestation service is external to the first blockchain.

Clause 8: The method of any one of Clauses 1-6, wherein causing the amount of cryptocurrency to be minted on the second blockchain, comprises broadcasting a mint operation on the second blockchain in a third message.

Clause 9: The method of Clause 8, wherein the third message comprises the attestation of the second message.

Clause 10: The method of any one of Clauses 1-9, wherein the blockchain-based transaction comprises a stable coin transfer between the first blockchain and the second blockchain.

Clause 11: A processing system, comprising: a memory comprising computer-executable instructions; and a processor configured to execute the computer-executable instructions and cause the processing system to perform a method in accordance with any one of Clauses 1-10.

Clause 12: A non-transitory computer-readable medium comprising computer-executable instructions that, when executed by a processor of a processing system, cause the processing system to perform a method in accordance with any one of Clauses 1-10.

Clause 13: A processing system, comprising for means for performing a method in accordance with any one of Clauses 1-10.

Clause 14: A computer program product embodied on a computer-readable medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing a blockchain-based transaction, comprising:
    broadcasting a burn operation on a first blockchain in a first message including a first recipient address associated with a second blockchain and an amount of cryptocurrency to be burned from a sender wallet corresponding to a sender address associated with the first blockchain;
    receiving a first attestation of the first message from an attestation service that the amount of cryptocurrency was burned from the sender wallet corresponding to the sender address associated with the first blockchain;
    prior to the amount of cryptocurrency being minted to a first recipient wallet corresponding to the first recipient address, receiving user input indicating that the first recipient address is incorrect;
    based on receiving the user input indicating that the first recipient address is incorrect, rebroadcasting the burn operation on the first blockchain in a second message including the first attestation of the first message and a second recipient address associated with the second blockchain;
    after rebroadcasting the burn operation on the first blockchain in the second message, receiving a second attestation of the second message from the attestation service that the amount of cryptocurrency of the burn operation was burned from the sender wallet corresponding to the sender address associated with the first blockchain; and
    based on receiving the second attestation of the second message from the attestation service, causing the amount of cryptocurrency to be minted on the second blockchain to a second recipient wallet corresponding to the second recipient address associated with the second blockchain.

2. The method of claim 1, wherein the first message is associated with a smart contract.

3. The method of claim 1, further comprising:
    requesting, from the attestation service, the first attestation of the first message; and
    requesting, from the attestation service, the second attestation of the second message.

4. The method of claim 1, wherein the cryptocurrency is a stable coin.

5. The method of claim 1, wherein the first attestation of the first message comprises a signature created based on a private key of the attestation service.

6. The method of claim 1, wherein the attestation service is external to the first blockchain.

7. The method of claim 1, wherein causing the amount of cryptocurrency to be minted on the second blockchain, comprises broadcasting a mint operation on the second blockchain in a third message.

8. The method of claim 7, wherein the third message comprises the second attestation of the second message.

9. The method of claim 1, wherein the blockchain-based transaction comprises a stable coin transfer between the first blockchain and the second blockchain.

* * * * *